United States Patent

[11] 3,615,587

[72] Inventor Hans Koopmans
 A. H. van de Venstraat 16, Bolsward, Netherlands
[21] Appl. No. 757,633
[22] Filed Sept. 5, 1968
[45] Patented Oct. 26, 1971
[32] Priority Sept. 5, 1967
[33] Netherlands
[31] 6712133

[54] METHOD OF PRODUCING CHEESE
11 Claims, 1 Drawing Fig.
[52] U.S. Cl. .................................................. 99/116, 31/89, 99/243
[51] Int. Cl. ............................................... A23c 19/02
[50] Field of Search ........................................ 99/115, 116, 243; 31/46, 89

[56] References Cited
UNITED STATES PATENTS

| | | | |
|---|---|---|---|
| 1,716,488 | 1/1929 | Doering et al. | 99/243 X |
| 3,156,567 | 11/1964 | Budahn | 99/115 |
| 3,167,862 | 2/1965 | Czulak | 99/115 |
| 3,355,805 | 12/1967 | Krueger | 31/46 |
| 3,394,011 | 7/1968 | Richardson et al. | 99/116 |
| 3,468,026 | 9/1969 | Robertson et al. | 31/46 X |

Primary Examiner—Lionel M. Shapiro
Assistant Examiner—D. M. Naff
Attorney—Christen & Sabol ABSTRACT: A method of making cheddar or similar cheese by a continuous process including the steps of cheddaring, flavoring, and homogenizing by precompressing the usual milled and salted curds under relatively high pressure for a short period of time, spraying them with hot water and subjecting them to a final compression at high pressure for a short period of time, before the process of curing.

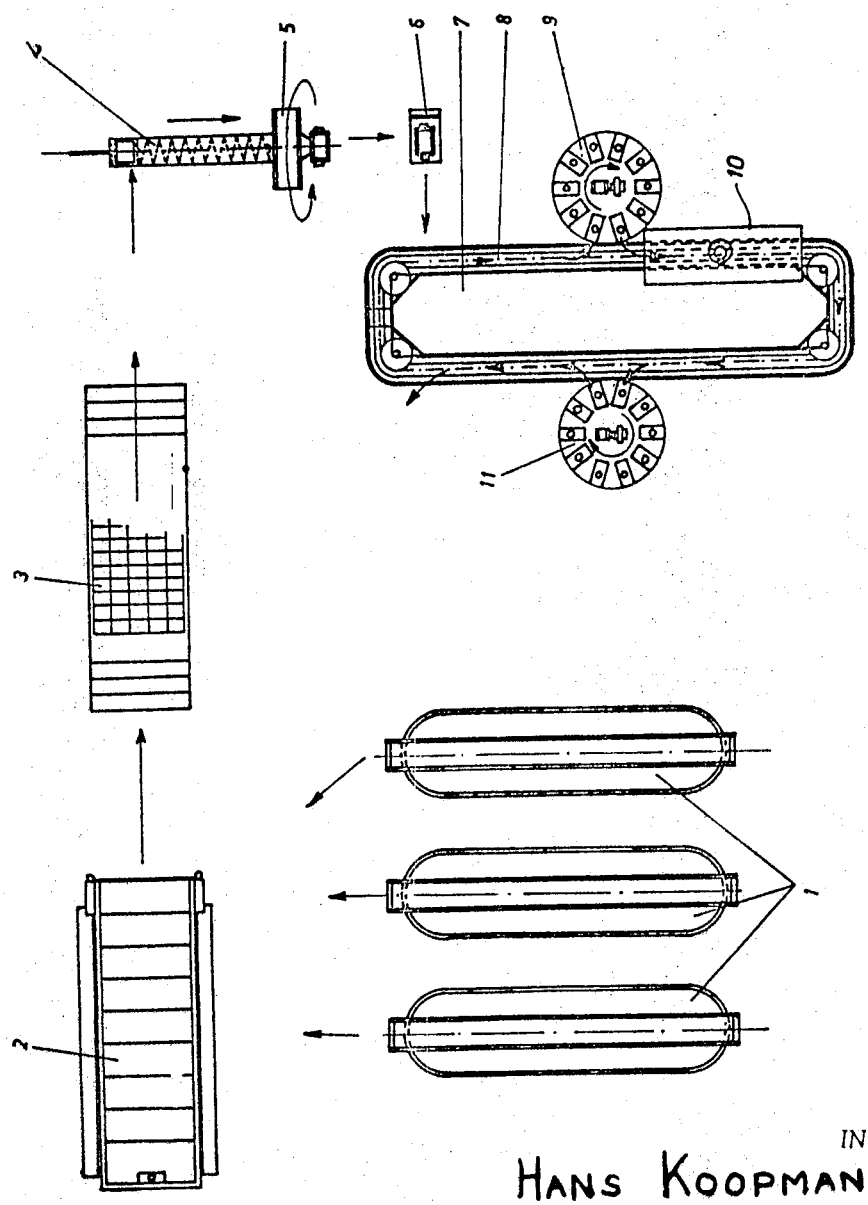

METHOD OF PRODUCING CHEESE

The invention relates to a method of producing cheddar or similar cheese, said method comprising the successive steps of: introducing the liquid mass of the prepared curds into the draining trough, removing the curds in elongated blocks from the draining trough subsequent to draining, carrying out the heating process during which the blocks are regularly turned over, cutting up the blocks in a mill to slices, which are salted and mixed with spices at will in a rotatable drum, introduced into vessels, precompressed, sprayed and finally again compressed.

The method of producing cheddar cheese hitherto known takes in total about 24 hours from beginning to end, about 20 hours being used after drainage of the curds.

Moreover, this process takes much labor and since the blocks of curds have to be turned over regularly the required workmen can be found only with increasing difficulty. The weight of the blocks is about 30 kgs. and the temperature is about 35° C. during the thermal process.

Precompression of the sliced curds, salted in a rotating drum, takes about 3 hours, after which the cheddar cheese is removed from the vessel of precompression, after which it is sprayed for rinsing off salts adhering to the outside. The blocks of cheese are then again compressed in a vessel for 15 to 16 hours.

In this way a homogeneous structure is obtained like it is required for cheddar cheese and similar cheese.

The method according to the present invention provides a considerable reduction of the process time and a mechanization and automation of the process and is characterized in that the thermal process is carried out on a plurality of endless conveyor belts, which perform in addition the turnover of the curds, while the sliced curds are introduced in measured quantities by weight into metal vessels closed by a metal follower, the curds being enveloped in a towel in the vessel and covered by a further towel, after which the vessel is conveyed on a conveyor belt to a press where the material is subjected to a high pressure for a short time and subsequently sprayed on all sides with warm water, after which it is again subjected to high pressure for a short time and conducted away.

It is preferred to use perforated metal vessels and perforated metal followers.

The method according to the invention is furthermore characterized in that the endless conveyor belts are arranged in a space, the humidity and temperature of which are maintained at a desired level. In the method according to the present invention the pH value of the whey is continuously measured, which whey flows out of the curds on the endless belts.

A further feature of the method according to the present invention resides in that the sliced curds are accurately weighted when conveyed from the so-called brine mill to the perforated vessels.

In the method according to the present invention the precompression period is preferably 3 to 10 minutes, the pressure being 3,000 to 12,000 kg. per cheese of about 20 kg. Rinsing is carried out on all sides for 2 to 8 minutes with water of 40° C. to 70° C. After-compression takes 3 to 20 minutes at a pressure of 3,000 to 12,000 kg. per cheese of about 20 kg.

The method according to the present invention is also suitable for compressing the cheese in vacuo. In this case the perforated vessel is surrounded by an outer vessel, the clearance between them accommodating water inlets and outlets and a suction valve for the air. In this case the inner vessel is preferably not perforated in part of the upper side for example, over a length of 10 cm. from the top.

When compressing in vacuo the rinsing tunnel is replaced by a connection with a hot-water mains for a short time. This time may be 2 to 5 minutes, whilst the temperature of the water may lie between 40° C. to 70° C. After for example 3 minutes the water outlet may be opened so that the rinsing space can be emptied and after-compression can be carried out. During compression the clearance between the perforated metal vessel and the outer vessel is caused to communicate with an air pump, which may be arranged on the compression table. The towels which favour drainage have a particularly useful effect in compressing in vacuo.

The invention will now be described more fully with reference to a schematic illustration of the method, to which the invention is of course not restricted.

Referring to the Figure reference numeral 1 designates the curds-preparing member, in this case three members. The curds are prepared therein for about 45 minutes per 800 kg. of cheese. The whey and the curds are then introduced into the draining trough 2, in which the curds settle, after which the whey can be drained. In the method hitherto known the curds were cut into blocks of about 30 kg. which were moved from the draining trough to a carriage so that these blocks could be turned over regularly. In the method according to the present invention the blocks of curds of 30 kg. can be conveyed by a conveyor belt to a belt system 3, in which a plurality of endless conveyor belts are arranged one above the other so that the contents of one draining trough can preferably be put on one conveyor belt, where the material remains for about 45 minutes. As soon as the next charge becomes available from the draining trough, the conveyor belt moves on so that the curds arrive at a second, lower conveyor belt so that the side of the block of curds first lying above is then in contact with the conveyor belt.

It should be noted that it is preferred to place the follower on the vessel during the pre- and after-compression processes, since the end of the plunger of the press is constructed as a follower.

The width of the endless conveyor belt is preferably greater than the width of the draining trough. The belt will slightly curve upwards so that the whey flowing out of the blocks of curds can be collected in gutters along the conveyor belt. The second endless conveyor belt is similar to the first, but it is shifted about 50 cm. in the direction of travel of the first conveyor belt. The second endless conveyor belt is similar to the first but it is shifted about 50 cm. in the direction of travel of the first conveyor belt, while the third belt is located beneath the first and if a fourth and fifth conveyor belt are provided, they are also arranged beneath the second and the first conveyor belts respectively.

In the method according to the invention the curds remain on the belts until the emanating whey has reached the desired pH value, which may be, for example, after 3 hours.

The whole conveyor system may be arranged below a hood so that cooling of the curds is prevented and the desired temperature of, for example, 38° C. and the desired humidity of the space can be maintained. The hood may be arranged so that it can be easily displaced upwardly for rendering the system accessible for cleaning and inspection purposes and the like.

The thermal process according to the present invention then carried out on the endless conveyor belts of the group 3 saves labor owing to the automatic turn of the blocks of curds and is simpler and better checked by means of the emanating whey, which is collected in gutters along the edges of the belts, since as soon as the desired pH value of the whey is attained the curds can be conducted away to the cheddar mill 4, where the cheddar is sliced up and the slices are introduced into a rotating drum 5, in which the curds are salted. From the drum the cheese thus prepared is introduced into vessels, for example, on the table 6 provided with a built-in balance which is capable of shutting off the cheese supply when the desired weight is reached.

The vessels thus filled are transported preferably by a conveyor belt to the press device 7, which comprises a conveyor belt 8 which conveys the filled vessels, preferably perforated metal vessels to the precompression system 9, where the vessels are subjected, for example, for a circulation time of 5 minutes to a pressure of about 5,000 to 7,000 kg. a cheese, the vessel being then introduced into a spraying tunnel 10, the time of passage being for example 3 minutes, while the cheese is sprayed on six sides with water of 50° C. to 60° C.

The same conveyor belt moves the perforated vessels subsequently to the after-compression system 11, where the cheese is subjected, for example, for 10 minutes, to a pressure of 5,000 to 7,000 kg. a block. The vessels are again moved to a conveyor belt and the cheese is then removed from the vessel, the curds towel and the covering towel being removed from the cheese.

In order to ensure a continuous passage of filled vessels the after-compression system of this embodiment will be able to accommodate twice as many vessels as the precompression system in view of the double time required for final compression.

The novel method of pre- and after-compression saves much labor since it is no longer necessary to stack up the vessels, to subject them to pressure, to remove subsequently the cheese from the vessels and to rinse the material and to reintroduce the cheese into the vessels, to stack them up again and to compress again: the novel method provides in addition 18 hours of time saved.

Tests have shown that the structure of the cheese prepared by the method according to the present invention is even more homogeneous than that produced by the method hitherto know.

It is furthermore possible to compress the cheese in vacuo, in which case the perforated vessels are surrounded by an outer vessel, the clearance being, for example, 15 mm. where the water inlet and outlet duct are arranged as well as an air suction valve. The inner vessel will then preferably not be perforated over a distance of 10 cm from the top.

When compressing in vacuo only one rotatable table is needed, since the vessels need not pass through the rinsing tunnel, because the vessel is connected for 3 minutes, for example, with a hot water mains, the temperature of the water being 50° to 60° C. After this period of 3 minutes the water outlet is opened so that the rinsing space is emptied.

During compression the clearance space between the vessels is caused to communicate with an air pump, which may be arranged on the compression table. After the pre- and after-compressions the follower is automatically withdrawn from the vessel, since it is secured to the plunger of the press. The towels are removed from the cheese, which finishes the process. Particularly in the vacuum process said towels are favorable for the further drainage.

I claim:

1. In a method of producing cheddar or similar cheese which consists essentially of the steps of introducing the liquid mass from the curds-preparing means into a draining trough to drain the whey from the curds, forming the drained curds into blocks, continuously subjecting each successive one of said blocks to an elevated temperature in a first position in a confined space for an initial period, altering the position of each successive one of said blocks during a later portion of the time each block is subjected to said elevated temperature, milling the blocks into particles, treating the particles by adding salt and desired spices, combining successive amounts of said treated particles into successive conglomerations of treated particles, each having a predetermined weight, successively subjecting each of said conglomerations to precompression in a vessel at a pressure equivalent to subjecting a 20 kg. quantity of said conglomeration to a pressure of at least 3,000 kg. for a period of time between 3 and 10 minutes, spraying the precompressed conglomerations with hot water, subjecting each said conglomerations to a final compression in said vessel at a pressure equivalent to subjecting a 20 kg. quantity of said conglomeration to a pressure of at least 3,000 kg. for a period of time between 3 and 20 minutes, and conducting away the compressed conglomerations for curing.

2. A method as defined in claim 1, characterized in that said confined space is maintained at a predetermined temperature and humidity.

3. A method as defined in claim 1, characterized in that said predetermined temperature is approximately 38° C.

4. A method as defined i claim 1, characterized in that said step of altering the position of each successive one of said blocks is carried out by transferring the blocks between a plurality of endless conveyor belts.

5. A method as defined in claim 1, characterized in that the pH value of the whey drained from the curd is continuously measured.

6. A method as defined in claim 1, characterized in that said conglomerations of treated particles are automatically weighted.

7. A method as defined in claim 1, characterized in that said steps of precompression and final compression are carried out in a vessel having perforated walls.

8. A method as defined in claim 1, characterized in that the pressure for the precompression is 3,000–12,000 kg. per block of cheese of about 20 kg.

9. A method as defined in claim 1, characterized in that after the first compression the material is sprayed on all sides for 2 to 8 minutes with water of a temperature of 40° to 70° C.

10. A method as defined in claim 1, characterized in that the pressure for the final compression is 3,000 to 12,000 kg. per block of cheese of about 20 kg.

11. A method as defined in claim 1, characterized in that the cheese is compressed and sprayed in vacuo.